(12) United States Patent
Hoppler et al.

(10) Patent No.: US 7,312,258 B2
(45) Date of Patent: Dec. 25, 2007

(54) METHOD FOR TREATING A MINERAL FILLER WITH A POLYDIALKYLSILOXANE AND A FATTY ACID, RESULTING HYDROPHOBIC FILLERS AND USES THEREOF IN POLYMERS FOR BREATHABLE FILMS

(75) Inventors: Hans Ulrich Hoppler, Rothrist (CH); Edwin Ochsner, Vordemwald (CH); Daniel Frey, Safenwil (CH)

(73) Assignee: Omya Development AG, Oftringen (CH)

( * ) Notice: Subject to any disclaimer, the term of this patent is extended or adjusted under 35 U.S.C. 154(b) by 0 days.

(21) Appl. No.: 10/451,785

(22) PCT Filed: Jan. 10, 2002

(86) PCT No.: PCT/IB02/00900

§ 371 (c)(1),
(2), (4) Date: Dec. 29, 2003

(87) PCT Pub. No.: WO02/055596

PCT Pub. Date: Jul. 18, 2002

(65) Prior Publication Data

US 2004/0097616 A1    May 20, 2004

(30) Foreign Application Priority Data

Jan. 12, 2001 (FR) ................... 01 00365

(51) Int. Cl.
*C08K 9/06* (2006.01)
(52) U.S. Cl. .................... 523/212; 524/426; 524/427; 524/451; 524/447; 524/445; 524/430; 524/423; 524/433; 524/449
(58) Field of Classification Search ............... 428/405; 523/213, 212; 524/426, 427, 451, 447, 445, 524/430, 423, 433, 449
See application file for complete search history.

(56) References Cited

U.S. PATENT DOCUMENTS

| 5,827,906 A | * | 10/1998 | Metzemacher et al. ..... 523/205 |
| 6,498,211 B2 | * | 12/2002 | Kobayashi et al. ......... 524/588 |
| 6,605,231 B2 | * | 8/2003 | Kobayashi et al. ........... 252/62 |
| 6,749,838 B1 | * | 6/2004 | Joichi et al. .................. 424/59 |

FOREIGN PATENT DOCUMENTS

| JP | 07 157654 | | 6/1995 |
| WO | 96 26240 | | 8/1996 |
| WO | 98 46673 | | 10/1998 |
| WO | 01/13874 | * | 3/2001 |

* cited by examiner

*Primary Examiner*—Margaret G. Moore
(74) *Attorney, Agent, or Firm*—Oblon, Spivak, McClelland, Maier & Neustadt, P.C.

(57) ABSTRACT

The invention relates to a method for treating a mineral filler by means of a polydialkylsiloxane and a fatty acid, the hydrophobic fillers thus obtained, and the application thereof in polymers for the manufacture of films and notably "breathable" films.

1 Claim, No Drawings

METHOD FOR TREATING A MINERAL FILLER WITH A POLYDIALKYLSILOXANE AND A FATTY ACID, RESULTING HYDROPHOBIC FILLERS AND USES THEREOF IN POLYMERS FOR BREATHABLE FILMS

The present invention relates to the technical sector of treated mineral fillers, notably treated carbonates, notably calcium carbonates, and the applications thereof in industry.

More particularly, the invention relates to the treatment of such fillers with a view to making them hydrophobic and incorporating them in polymers, for example for manufacturing films, notably "breathable" films, themselves incorporated for example in articles such as disposable nappies and similar products.

In order to achieve industrial applications in the above fields, it is necessary to produce mineral fillers, notably calcium carbonates, having excellent hydrophobicity and excellent repellency of water and aqueous fluids, and which can be mixed or "compounded" in appropriate polymers, generally polyolefins or mixtures or combinations of polyolefins.

So-called "breathable" films are well known to the skilled man in the art, in the aforementioned applications, as well as the properties required of them.

It is known notably that they must have a very good characteristic of water vapour transmission (which corresponds to their so-called "breathable" film characteristic). It is considered that the incorporated filler contributes, during a notably uni- or biaxial stretching, to the creation of micropores which increases this characteristic of "breathability". The filler therefore has prime importance in the final product obtained, and its properties.

In this light, the aspect ratio of the filler particle must be close to 1 (ratio between length and mean diameter). The filler must not contain coarse particles, notably with a dimension greater than approximately 10 micrometres, with a granulometry "top cut" of less than 10 micrometres, and the filler must contain only a small proportion of particles with an equivalent spherical diameter of less than 0.5 micrometres, that is to say the BET specific surface area of the filler must be less than 6 m²/g.

Naturally the treatments envisaged must be compatible with current regulations.

It is also necessary, in almost all the applications to which this type of product relates, for the incorporated filler not to impair the suitability of the plastic film for being stretched or oriented uni- or biaxially. It is also necessary, in order not to create predictable dosage problems during incorporation into the polymer, for the flowability properties of the filler to be good. It is also naturally necessary for the filler to be able to mix easily with the polymer, and to disperse uniformly in the polymer matrix, failing which the final film would be non-homogenous. During the incorporation of the polymer, the treated filler must not give off gaseous substances, which would in the film result in areas which are cloudy and mechanically non-homogenous.

It is also necessary for the treatment not to affect the uniformity of the colour of the film obtained, that is to say to make it possible to obtain a film without mottling.

It can be seen that the problems and requirements related to the treatment of such fillers are many and complex, and sometimes contradictory.

In the field in question calcium carbonates treated by means of stearic acid are known. For example, R. Rothon, "Particulate-Filled Polymer Composites", Longman, Harlow, 1995, Ch. 4, will be cited.

Fillers are also known treated by means of silanes (E. P. Plueddemann, Silane Coupling Agents, Plenum Press, New York, 1982).

Fillers are also known which are treated by means of organopolysiloxanes with H—SiO— bonds (patent EP 0 257 423) but which do not make it possible to obtain fillers which can be used in the field of so-called breathable films.

Fillers are also known treated with stearic acid and then a siloxane, but in totally different applications.

However, current treatments with silane give rise to the release of methanol.

Thus the article "NMR Spectroscopic Investigations on the Hydrolysis of Functional Trialcoxysilanes" published in Zeitung für Naturforschung, 54b, 155-164 (1999) describes a release of methanol.

The patent WO 99/61521 describes a carbonate treated on the surface in order to obtain better hydrophobicity. The treatment employs stearic acid, as in the patent WO 99/28050.

The patent WO 96/26240 describes fillers flame retarded following treatment with fatty acid alone or with a fatty acid and a derivative of siloxane. The application sought is situated in the field in which the polymers must have the property of non-flammability.

The patent JP 57 182 364 describes fillers used as facade coatings for construction materials, the said coating being impervious to water, and containing both a synthetic resin and a filler treated with a flame-retardant agent. The resins are derivatives of vinyl acetate or acrylate-vinyl acetate copolymers, which are not suitable for being oriented uniaxially or biaxially, and which are not intended for breathable films. The filler must have a very high granulometry, up to 100 micrometres. The treatment exemplified is given for stearic acid and methylcellulose, on an acrylic resin.

The patent WO 98/29481 is also known, which describes breathable films and which incorporates calcium carbonate as a filler. Reference can be made to this document with regard to the generalities relating to the characteristics of the so-called breathable films. With regard to the filler, the patent indicates only that it can be treated with a fatty acid, such as stearic or behenic acid, "in order to facilitate bulk flow and dispersion in the polymer matrix".

The patent JP 52 39377 describes the use of stearin for preparing fillers, but in order to obtain better physical properties for the resin matrix.

The patent WO 00/12434 describes the use of a desiccant, notably CaO, for preparing fillers for obtaining breathable films suitable to the user.

The prior art devoted to breathable films has therefore used treatment with stearic acid or desiccant products of the CaO type. Stearic acid has also been employed for treating fillers, but in totally different applications. A combination of fatty acid and silane has also been used.

No trend therefore stands out in the prior art, except for the treatment of a filler with fatty acid alone or by the combination of fatty acid and silane in order to form a "coating".

There therefore exists a constant search, and therefore a significant recognised need, for the improvement of breathable films, and notably the obtaining of films without mottling and without empty spaces as well as for the improvement of the treated filler which such films contain.

The invention relates to a method for treating mineral fillers in order to confer a hydrophobic character on them, making them suitable for being incorporated in polymers by means of which the so-called "breathable" films are produced, notably films of polyolefin(s), characterised in that a surface treatment of the filler is carried out, in two steps, the first step (pretreatment) comprising a treatment with at least one polydialkylsiloxane and the second step comprising a treatment with at least one fatty acid containing more than 10 carbon atoms, the two steps being able to be carried out simultaneously.

The invention therefore relates to a method for treating mineral fillers as described above, which surprisingly combines first of all a pretreatment by means of a polydialkylsiloxane and then a treatment with a fatty acid such as stearic acid.

The combination of these two treatments, and in this order, results in a particular set of properties, as demonstrated below, with a synergy effect between the two treatment agents.

In practice, the polydialkylsiloxane will be added firstly and then the fatty acid immediately afterwards.

It is possible however in certain cases to effect the two additions simultaneously, but taking care to ensure that the fatty acid never comes into contact first with the filler.

In general, it will be preferred to operate in two clearly distinct steps, that is to say the addition of polydialkylsiloxane and then the addition of fatty acid.

Throughout the remainder of the present application, the Applicant therefore means, by treatment in two steps, a treatment in which the addition of the two compounds takes place either in two steps separate in time, even with a short interval of time, or substantially simultaneously provided that the fatty acid does not come into contact with the filler before the polydialkylsiloxane.

More particularly, the invention applies perfectly to natural calcium carbonates such as marble and calcite or a mixture of them.

The invention also applies however to fillers such as precipitated calcium carbonate, talc, kaolin, magnesium hydroxide, various fillers of the type consisting of clay, silica, alumina, barium sulphate, mica, calcium oxide or hydroxide, aluminium oxides, mixtures thereof and the like.

On the other hand, chalk does not give good results, which clearly indicates that the probability of success of the invention was not absolutely to be taken for granted.

According to a preferred embodiment, use is made of a polydialkylsiloxane of formula: $(R)_3-Si-O-[(R)_2-Si-O-]_n-Si-(R)_3$ whose alkyl group R is C1-C4.

In a particularly preferred manner, use is made of a polydimethylsiloxane (PDMS), for which the R group is the methyl radical.

According to a preferred embodiment, use will be made of a polydimethylsiloxane with a kinematic viscosity of between 50 and 100,000 centistokes (cSt), preferably between 300 cSt and 5000 cSt, very preferably around 1000 cSt.

The best hydrophobicity is obtained between approximately 700 cSt and 1300 cSt.

As a fatty acid, use can be made of any fatty acid having more than 10 carbon atoms, and in an entirely preferred manner stearic acid, palmitic acid, behenic acid and mixtures thereof.

According to a preferred and naturally non-limitative embodiment, the implementation of the method according to the invention is effected as follows:

a high-speed mixer is used, in which the ground filler is placed, the polydialkylsiloxane is added at a temperature of around 100° C., over 5 minutes, and, at the end of these 5 minutes, the fatty acid is added.

It should be noted in this regard that polydialkylsiloxane has the advantage of conferring nonstick properties on the mixture, which does not adhere to the walls of the mixer (but which adheres when no polydialkylsiloxane is used).

The above method is preferably applicable to marble or calcite or mixtures thereof as a filler, to polydimethylsiloxane as polydialkylsiloxane, and to stearin (a mixture of approximately 65% stearic acid and 35% palmitic acid) as a fatty acid having more than 10 carbon atoms.

According to yet another preferred embodiment, use will be made of 100 to 2000 ppm of polydialkylsiloxane by weight of dry filler, preferably 200 to 1000, and in an entirely preferred manner around 500.

According to yet another preferred embodiment, use will be made of 0.6% to 1.4% fatty acid by dry weight of dry filler, preferably 0.8% to 1.2%.

The invention also relates to the above-cited fillers characterised above in that they have been treated by the method according to the invention.

The invention more particularly relates to the fillers of this type, characterised in that they have high flowability, a BET specific surface area of between 2 and 6 $m^2/g$ and a granulometry top cut of less than 10 micrometres, and preferably less than 8 micrometres.

By filler with a high flowability, the Applicant means a filler with an incline angle rate (rate between the incline angle rate of the treated filler and the incline rate of the non treated filler) determined by the following method, called "pile method", incline angle rate which is less than or equal to 0.98.

In practice, the determination of the incline angle representing the flowability of a powder is carried out by weighing 150 grams of the powder. Then the powder is put in a 45 cm long vibratory feeder. By steady vibration of the feeder adjusted at level 8, the powder is transported ahead and put over the rim on the film, resulting in a powder pile, which is function of the filler. The incline angle $\alpha$ is then calculated by tan $\alpha$=Pile Height/Pile Radius.

The smaller the angle the better the flowability of the powder

The invention even more particularly relates to the said fillers characterised in that they have high hydrophobicity, that is to say in that they have a turbidity index of between 0.9 and 1 and a foam index of between 0.7 and 1, the two indices being determined by the method described below, referred to as the "whizzing method", and in that they have a low moisture pickup, that is to say a moisture pickup less than or equal to 0.42 $mg/m^2$ measured by the method described below and referred to as the moisture pickup method.

In order to measure the hydrophobicity of the filler according to the invention, the so-called whizzing method consists of introducing 0.5 grams of the sample whose hydrophobicity it is wished to determine, into a shaken test tube containing 3 ml of demineralised water. After 5 seconds of stirring at 2000 rev/min, the turbidity, determined by means of a UV and visible spectrometer, is calibrated between 0 and 1. The turbidity index of 0 corresponds to a cloudy supernatant, the turbidity index of 1 corresponds to clear water without any turbidity.

In a second step, there is added to the dilute sample 0.5 ml of hydrochloric acid, with a concentration of 18% by weight, under stirring equal to 2000 rev/min for 5 seconds.

There then occurs a release of carbon dioxide due to the acid attack. At one end of the calibration scale, a strong acid attack will then create a high release of carbon dioxide resulting in a high presence of foam corresponding to a foam index of 0 and zero hydrophobicity whilst at the other end of the calibration scale a completely hydrophobic product creates no release of carbon dioxide nor any foam, the foam index then being one.

The method described below, referred to as the moisture pickup method, is based on the measurement of the increase in weight of the powdery sample to be tested first of all placed, for 5 hours, in an atmosphere with a relative humidity of 10% and at room temperature, and then placed for 2 hours in an atmosphere at a relative humidity of 90%.

Knowing the BET specific surface area of the sample tested, the quantity of water absorbed per unit surface in $g/m^2$ is then determined.

The invention also relates to all the applications of these treated fillers in any sector of industry, notably the sectors where a hydrophobic character of the filler is required.

The fillers treated according to the invention can advantageously be incorporated in polyolefins, alone or in mixtures, the said polyolefins being able to be chosen, non-limitatively, from amongst the following: low-density linear polyethylene, low-density polyethylene, high-density polyethylene and polypropylene and mixtures thereof.

The incorporation in the polyolefin or the appropriate mixture of polyolefins is effected in known equipment, and in a manner known to the skilled man in the art.

Likewise, reference can be made to WO 98/29481, dealing with the same general application, for the manufacture of the breathable film with filler, notably its uni- or biaxial stretching.

In fact, the invention also relates to a method for manufacturing a so-called "breathable" film of polyolefin(s), containing at least one mineral filler of the type mentioned above, and characterised in that the said filler has been treated by the method also described above.

According to the invention, master-batches or "compounds" are produced which contain 20% to 80% by weight of treated filler with respect to the total weight, preferably 45% to 60% by weight and particularly approximately 50% by weight.

According to a preferred embodiment, the said film undergoes a uni- or biaxial stretching (or "orientation").

The invention also relates to the articles containing at least one such film, notably the products absorbing water or aqueous fluids such as disposable nappies and similar products.

The manufacture of such products is well known to the skilled man in the art, as are the film stretching methods.

The invention also relates to the films thus obtained, in the non-stretched or uni- or biaxially stretched state.

The invention also relates to the master-batches or "compounds" of polyolefin(s) and filler(s) treated according to the present invention, that is to say before putting in the form of a film.

The invention more particularly relates to the said master-batches or "compounds", characterised in that they have a melt volume-flow rate (MVR) greater than 6 $cm^3/10$ min (temperature 190° C., load 5 kg, die diameter 2.095 mm) measured according to ISO 1133 and a high thermal stability, that is to say a thermal stability expressed, according to the followed method referred to as the strip method, by a length of non-discoloured strip greater than or equal to 20 cm.

The thermal stability determination method consists in putting the compound in the form of a granule in an extruder in order to extrude a bar. The said bar of compound is placed in an oven (Mathis Thermotester™ sold by Werner Mathis AG) set at 220° C. As soon as the bar is placed in the oven, it is moved towards the outside of the oven at a translation speed of 0.833 mm/min.

Then the length of the bar where there is no change of colour is determined. The longer this length, the more thermally stable the compound is.

Finally, the invention relates to the films themselves, containing at least one filler treated according to the invention.

The invention more particularly relates to the said films, characterised in that they are breathable films having a mottling index less than 10, measured according to the method described below and referred to as the "mottling viewer" method.

This mottling index is defined as a dimensionless number which measures the irregularities on the surface of the structure of the sample. A low value of the mottling index indicates a surface with a very homogeneous structure.

To do this, a sample (20 cm long, 15 cm wide and 20 micrometres thick) of the film to be tested is fixed, by means of an adhesive, to a sheet of black paper of DIN A4 format and with a mottling index of 2.01.

This sample thus prepared is placed in a colour scanner (PowerLook™ III from UMAX™ Systems GmbH) for acquiring the image data of the surface of the sample. It should be noted that the sample must first of all be displayed on a screen in order to select the region without folds, in order not to falsify the results through an imperfect preparation of the sample.

The image data are then transmitted into a computer equipped with an SVGA graphics system and a PapEye™ image analyser from ONLY Solutions GmbH in order to give the value of the mottling index.

The invention also relates to all the polyolefin articles containing at least one such filler, even in a form other than a film.

The invention also relates to all the applications of these films and articles, in any sector of industry, notably the sectors where a hydrophobic character of the filler and good redispersibility are required.

The invention will be better understood from a reading of the following description, and the non-limitative examples below.

EXAMPLE 1

This example relates to the method for treating according to the invention a marble with a mean diameter of 1.8 μm, with a top cut of less than 8 μm and with a BET specific surface of area 4 $m^2/g$ for tests n° 1 to 7.

To do this, measurements are made, for the different tests of the example and according to the aforementioned methods, for the mineral filler, of the flowability, of the hydrophobicity and the moisture pickup for the compound, the MVR and the thermal stability for the film, the mottling index.

Test N° 1

This test is a reference test using the untreated marble.

This untreated filler has an incline angle of 40°, a turbidity index of 0, a foam index of 0, and a moisture pickup of 0.95 $mg/m^2$.

The master-batch or compound contains 50% by weight of the mineral filler, 49.7% by weight of a linear low density polyethylene with an MVR of 15.4 cm$^3$/10 min measured according to ISO 1133 and 0.3% by weight of a thermal stabiliser.

The compound obtained has an MVR of 5.2 cm$^3$/10 min and a length representing the thermal stability of 10 cm. The film using the compound obtained is prepared on a "cast film" production line.

The cylinder of the extruder has a temperature of around 240° C. to 250° C. and the stretching unit has a temperature of 80° C.

The speed of entry of the film on the first roller of the stretching unit is 20 m/min, and the exit speed from the last roller of the stretching unit is 40 m/min.

The mottling index of the film obtained is 31.2.

Test N° 2

This test illustrates the prior art and uses a marble with a mean diameter of 1.8 μm, a top cut of less than 8 μm and a BET specific surface area of 4 m$^2$/g, treated by means of 1% by weight of stearin.

This treated filler has an incline angle of 45°, a turbidity index of 1, a foam index of 0.8 and a moisture pickup of 0.45 mg/m$^2$.

The master-batch or compound contains 50% by weight of the mineral filler, 49.7% by weight of the same polymer as in Test N° 1 and 0.3% by weight of the same stabiliser as in Test N° 1, and has an MVR of 9.3 cm$^3$/10 min and a length representing the thermal stability of 23 cm.

The film using the compound obtained, prepared under the same operating conditions and with the same equipment as in Test N° 1, has a mottling index of 21.1.

Test N° 3

This test illustrates a reference and uses the marble with a mean diameter of 1.8 μm, a top cut of less than 8 μm and a BET specific surface area of 4 m$^2$/g, treated by means of 500 ppm by weight of a hexadecyltrimethoxysilane.

This treated filler has a turbidity index of 0, a foam index of 0 and a moisture pickup of 0.88 mg/m$^2$.

The master-batch or compound contains 50% by weight of the mineral filler, 49.7% by weight of the same polymer as in Test N° 1 and 0.3% by weight of the same stabiliser as in Test N° 1, and has an MVR of 6.2 cm$^3$/10 min and a length representing the thermal stability of 6 cm.

The film using the compound obtained, prepared under the same operating conditions and with the same equipment as in Test N° 1, has a mottling index of 33.3.

Test N° 4

This test illustrates the prior art and uses the marble with a mean diameter of 1.8 μm, a top cut of less than 8 μm and a BET specific surface area of 4 m$^2$/g, treated by means first of all of 1% by weight stearin and then 500 ppm of the same silane as that used in the previous test.

This treated filler has a turbidity index of 1, a foam index of 0.75 and a moisture pickup of 0.43 mg/m$^2$.

The master-batch or compound contains 50% by weight of the mineral filler, 49.7% by weight of the same polymer as in Test N° 1 and 0.3% by weight of the same stabiliser as in Test N° 1, and has an MVR of 9.5 cm$^3$/10 min and a length representing the thermal stability of 23 cm.

The film using the compound obtained, prepared under the same operating conditions and with the same equipment as in Test N° 1, has a mottling index of 21.0.

Test N° 5

This test illustrates a reference and uses the marble with a mean diameter of 1.8 μm, a top cut of less than 8 μm and a BET specific surface area of 4 m$^2$/g, treated by means of 500 ppm by weight of polydimethylsiloxane with a kinematic viscosity of 1000 cSt.

This treated filler has a turbidity index of 0, a foam index of 0 and a moisture pickup of 0.80 mg/m$^2$.

The master-batch or compound contains 50% by weight of the mineral filler, 49.7% by weight of the same polymer as in Test N° 1 and 0.3% by weight of the same stabiliser as in Test N° 1, and has an MVR of 6.1 cm$^3$/10 min and a length representing the thermal stability of 6 cm.

The film using the compound obtained, prepared under the same operating conditions and with the same equipment as in Test N° 1, has a mottling index of 29.7.

Test N° 6

This test illustrates the invention and uses the marble with a mean diameter of 1.8 μm, a top cut of less than 8 μm and a BET specific surface area of 4 m$^2$/g, treated first of all by means of 500 ppm of polydimethylsiloxane with a kinematic viscosity of 1000 cSt and then by means of 1% stearin.

This treated filler has an incline angle of 36° then a R rate of 0.9, a turbidity index of 1, a foam index of 0.8 and a moisture pickup of 0.39 mg/m$^2$.

The master-batch or compound contains 50% by weight of the mineral filler, 49.7% by weight of the same polymer as in Test N° 1 and 0.3% by weight of the same stabiliser as in Test N° 1, and has an MVR of 9.2 cm$^3$/10 min and a length representing the thermal stability of 23 cm.

The film using the compound obtained, prepared under the same operating conditions and with the same equipment as in Test N° 1, has a mottling index of 7.6.

Test N° 7

This test illustrates the invention and uses the marble with a mean diameter of 1.8 μm, a top cut of less than 8 μm and a BET specific surface area of 4 m$^2$/g, treated by means of 500 ppm of polydimethylsiloxane with a kinematic viscosity of 1000 cSt, and by means of 1% stearin used simultaneously.

This treated filler has an incline angle of 36° then a R rate of 0.9, a turbidity index of 1, a foam index of 0.9 and a moisture pickup of 0.42 mg/m$^2$.

The master-batch or compound contains 50% by weight of the mineral filler, 49.7% by weight of the same polymer as in Test N° 1 and 0.3% by weight of the same stabiliser as in Test N° 1, and has an MVR of 9.4 cm$^3$/10 min and a length representing the thermal stability of 20 cm.

The film using the compound obtained, prepared under the same operating conditions and with the same equipment as in Test N° 1, has a mottling index of 7.8.

Test N° 8

This test illustrates the invention and uses a marble with a mean diameter of 1.8 μm, a top cut of 10 μm and a BET specific surface area of 2.4 m$^2$/g, treated by means of 300 ppm of polydimethylsiloxane with a kinematic viscosity of 1000 cSt, and by means of 0.6% stearin.

This treated filler has an incline angle of 34° then a R rate of 0.85, a turbidity index of 0.9, a foam index of 0.8 and a moisture pickup of 0.42 mg/m$^2$.

The master-batch or compound contains 50% by weight of the mineral filler, 49.7% by weight of the same polymer as in Test N° 1 and 0.3% by weight of the same stabiliser as in Test N° 1, and has an MVR of 9.7 cm$^3$/10 min and a length representing the thermal stability of 20 cm.

The film using the compound obtained, prepared under the same operating conditions and with the same equipment as in Test N° 1, has a mottling index of 9.9.

Test N° 9

This test illustrates the invention and uses a precipitated calcium carbonate with a mean diameter of 1.4 μm, a top cut of 7 μm and a BET specific surface area of 5.3 m²/g, treated by means of 500 ppm of polydimethylsiloxane with a kinematic viscosity of 1000 cSt, and by means of 1.3% stearin.

greater than 1500 ppm per volume), unlike Tests N° 6 to 10 according to the invention.

The same release of methanol is observed in Test N° 4, where stearic acid and a silane are combined.

The quantity of methanol released during the treatment is measured by means of a Dräger™ Tube 81 01 631 according to the instructions of use from the company Drager Sicherheitstechnik GmbH, Lubeck, Germany, of November 1999 (5$^{th}$ edition).

All the results obtained in these tests are set out in Table 1 below.

TABLE 1

| | TEST N° | Reference 1 | Prior art 2 | Reference 3 | Prior art 4 | Reference 5 | Invention 6 | Invention 7 | Invention 8 | Invention 9 | Invention 10 |
|---|---|---|---|---|---|---|---|---|---|---|---|
| Method | Treatment | — | 1% stearin | 0.05% silane | 1% stearin + 0.05% silane | 0.05% PDMS | 0.05% PDMS + 1% stearin | 0.05% PDMS + 1% stearin simultaneously | 0.03% PDMS + 0.6% stearin | 0.05% PDMS + 1.3% stearin | 0.05% PDMS + 1.2% behenic acid |
| Filler | "Whizzing method": | | | | | | | | | | |
| | a) turbidity index | 0.0 | 1.0 | 0.0 | 1.0 | 0.0 | 1.0 | 1.0 | 0.9 | 0.95 | 1.0 |
| | b) foam index | 0.0 | 0.8 | 0.0 | 0.75 | 0.0 | 0.8 | 0.9 | 0.8 | 0.9 | 0.9 |
| | Humidity pickup mg/m² | 0.95 | 0.45 | 0.88 | 0.43 | 0.80 | 0.39 | 0.42 | 0.42 | 0.37 | 0.40 |
| Compound | MVR (in cm³/10 min) | 5.2 | 9.3 | 6.2 | 9.5 | 6.1 | 9.2 | 9.4 | 9.7 | 9.1 | 9.2 |
| | Thermal stability (in cm) | 10 | 23 | 6 | 23 | 6 | 23 | 20 | 20 | 22 | 23 |
| Film | Mottling index | 31.2 | 21.1 | 33.3 | 21.0 | 29.7 | 7.6 | 7.8 | 9.9 | 9.1 | 8.4 |

PDMS: Polydimethylsiloxane

This treated filler has an incline angle of 36° then a R rate of 0.9, a turbidity index of 0.95, a foam index of 0.9 and a moisture pickup of 0.37 mg/m².

The master-batch or compound contains 50% by weight of the mineral filler, 49.7% by weight of the same polymer as in Test N° 1 and 0.3% by weight of the same stabiliser as in Test N° 1, and has an MVR of 9.1 cm³/10 min and a length representing the thermal stability of 22 cm.

The film using the compound obtained, prepared under the same operating conditions and with the same equipment as in Test N° 1, has a mottling index of 9.1.

Test N° 10

This test illustrates the invention and uses a marble with a mean diameter of 1.8 μm, a top cut of less than 8 μm and a BET specific surface area of 4 m²/g, treated by means of 500 ppm of polydimethylsiloxane with a kinematic viscosity of 1000 cSt, and by means of 1.2% behenic acid.

This treated filler has an incline angle of 36° then a R rate of 0.9, a turbidity index of 1, a foam index of 0.9 and a moisture pickup of 0.40 mg/m².

The master-batch or compound contains 50% by weight of the mineral filler, 49.7% by weight of the same polymer as in Test N° 1 and 0.3% by weight of the same stabiliser as in Test N° 1, and has an MVR of 9.2 cm³/10 min and a length representing the thermal stability of 23 cm.

The film using the compound obtained, prepared under the same operating conditions and with the same equipment as in Test N° 1, has a mottling index of 8.4.

It will be noted that Test N° 3 with a silane and without stearic acid produces a high release of methanol (a quantity A reading of Table 1 shows that only the tests according to the invention lead both to films with a mottling index less than 10 and to fillers having a high hydrophobicity, that is to say a turbidity index of between 0.9 and 1 and a foam index of between 0.7 and 1 and having a low moisture pickup, that is to say a moisture pickup less than 0.45 mg/m² measured by the method described above, and also to master-batches with a volume fluidity index (MVR) greater than 9 cm³/10 min (temperature 190° C., load 5 kg, die diameter of 2.095 mm) measured in accordance with ISO 1133 and a high thermal stability, that is to say a thermal stability expressed, according to the above method, by a length of non-discoloured strip greater than or equal to 20 cm.

The invention also covers all the embodiments and all the applications which will be directly accessible to the skilled man in the art from a reading of the present application, from his own knowledge, and possibly from simple routine tests.

The invention claimed is:

1. A method for manufacturing a breathable film of polyolefin(s), comprising manufacturing said breathable film from a master-batch comprising said polyolefin(s) and a mineral filler, wherein the master-batch has a melt volume-flow rate greater than 9 cm³/10 min (temperature 190° C., load 5 kg, die diameter of 2.095 mm) measured in accordance with ISO 1133 and a thermal stability expressed, according to the strip method, by a length of non-discolored strip greater than or equal to 20 cm;

and wherein the filler has been treated by a process comprising a two-step surface treatment of the filler, wherein the first step (pretreatment) comprises treating the filler with at least one polydialkylsiloxane, and the second step comprises treating the polydialkylsiloxane treated filler with at least one fatty acid having more than 10 carbon atoms, and the two steps can be carried out simultaneously, the filler is selected from the group consisting of marble, calcite, precipitated calcium carbonate, talc, kaolin, magnesium hydroxide, clays, silica, alumina, barium sulphate, mica, calcium oxide or hydroxide, aluminium oxide and mixtures thereof, and the filler has a turbidity index of between 0.9 and 1 and a foam index of between 0.7 and 1, the two indices being determined by the whizzing method, and a moisture pickup less than or equal to 0.42 $mg/m^2$ measured by the moisture pickup method.

* * * * *